United States Patent [19]

Kimura

[11] Patent Number: 5,319,765

[45] Date of Patent: Jun. 7, 1994

[54] SEMICONDUCTOR MEMORY UNIT UTILIZING A SECURITY CODE GENERATOR FOR SELECTIVELY INHIBITING MEMORY ACCESS

[75] Inventor: Masatoshi Kimura, Itami, Japan

[73] Assignee: Mitsubishi Denki Kabushiki Kaisha, Tokyo, Japan

[21] Appl. No.: 798,739

[22] Filed: Nov. 27, 1991

[30] Foreign Application Priority Data

Nov. 29, 1990 [JP] Japan .................. 2-325499

[51] Int. Cl.⁵ ............................................ G06F 12/14
[52] U.S. Cl. ........................ 395/425; 364/DIG. 1; 364/246.6
[58] Field of Search ... 364/200 MS File, 900 MS File; 395/425

[56] References Cited

U.S. PATENT DOCUMENTS

| | | | |
|---|---|---|---|
| 3,806,882 | 4/1974 | Clarke .................. | 395/425 |
| 4,590,552 | 5/1986 | Guttag et al. .......... | 395/425 |
| 4,713,753 | 12/1987 | Boebert et al. ........ | 395/425 |
| 4,797,853 | 1/1989 | Savage et al. ......... | 395/425 |
| 5,056,009 | 10/1991 | Mizuta ................. | 395/425 |
| 5,142,676 | 8/1992 | Fried et al. .......... | 395/425 |

FOREIGN PATENT DOCUMENTS 9109504  5/1984  European Pat. Off. .
0391603  10/1990  .
2070821  9/1981  United Kingdom .
2211327  6/1989  United Kingdom .

OTHER PUBLICATIONS van der Meulen et al, "Memory Access To A Chip Card", IBM Technical Disclosure Bulletin, vol. 24, No. 7B, Dec. 1981, pp. 3883–3884.

Primary Examiner—Joseph L. Dixon
Assistant Examiner—Matthew M. Kim
Attorney, Agent, or Firm—Leydig, Voit & Mayer

[57] ABSTRACT

A semiconductor memory unit in which a security code from a security code generation section and an address signal sent from a terminal to the address bus for pseudo access are collated with each other. A control bus changeover circuit connects a control bus to a memory to enable access to the memory when the security code and the address signal coincide with each other. A plurality of memory blocks, each having this security function, are connected in parallel with each other so that the memory blocks have respective independent security functions. A memory block selector selectively provides pseudo access to each of these memory blocks in accordance with an upper address of the address bus. Each memory block is provided with a pseudo access inhibition circuit to inhibit pseudo accessing after the number of pseudo accessing attempts equals a predetermined number.

11 Claims, 5 Drawing Sheets

SEMICONDUCTOR MEMORY UNIT UTILIZING A SECURITY CODE GENERATOR FOR SELECTIVELY INHIBITING MEMORY ACCESS

BACKGROUND OF THE INVENTION

1. Field of the Invention

This invention relates to a semiconductor memory unit and, more particularly, to its functions for increased security and access inhibition.

2. Description of the Related Art

FIG. 7 is a schematic block diagram of a conventional semiconductor memory unit. Ordinarily, an address bus 6, a control bus 7 and a data bus 8 are connected to a memory 2 incorporated in the semiconductor memory unit for the purpose of controlling read/write of an internal storage area of the memory. If the memory 2 is a SRAM (static random access memory), control bus 7 signals include a chip enable signal (CE), an output enable signal (OE), and write enable signal (WE). If the memory 2 is a ROM (read only memory), control bus 7 signals include a chip enable signal (CE) and an output enable signal (OE). The operation of such memory (memory IC) is described, for example, in "IC Memory Card Guide Line" issued from Japanese Electronic Industry Development Association in September 1986, and will not be specifically described in this specification.

Ordinarily, semiconductor memory units of this kind operate unconditionally in response to an external signal. That is, if a predetermined signal is applied, a read/write operation is performed; anybody can access the corresponding area of the memory.

Thus, in conventional semiconductor memory units, anyone can access a memory area for read/write and there is no security function for read/write operations. With the personalization of information and data, a need for prevention of forgery and unauthorized alteration or unauthorized copying of information and data has arisen. However, conventional semiconductor memory units can easily be operated to copy, alter or falsify applications software programs, operation systems, font data and other kinds of data having high development costs.

SUMMARY OF THE INVENTION

In view of the above-described problem, an object of the present invention is to provide a semiconductor memory unit having a security function such that read/write access to the memory area is inhibited if the memory unit is used by a person other than those permitted to use this memory unit or with a terminal (information processing apparatus) other than those of which use with this memory unit is permitted.

To achieve this object, according to one aspect of the present invention, there is provided a semiconductor memory unit connectable to an information processing apparatus to be used as a memory medium, comprising memory for storing information, accessing element including an address bus for accessing the memory, a control bus, a data bus, security code generation element for generating a predetermined security code, collation element, for collating the security code generated by the security code generation elements and an address signal on the address bus with each other, and control bus changeover element for connecting the control bus to the collation element when electric power is supplied, and for connecting the control bus to the memory to enable access to the memory when the collation element determines that the security code and the address signal coincide with each other, wherein collation between an address signal sent to the address bus and the security code is effected by pseudo access from the information processing apparatus when the semiconductor memory unit is connected to the information processing apparatus and supplied with power.

According to another aspect of the present invention, there is provided a semiconductor memory unit wherein a plurality of memory blocks each composed of the above-mentioned elements, i.e., the memory, the accessing element, the security code generation element, the collation means and the control bus changeover element and having security functions which become effective independently are connected in parallel with each other, the security code generation element of each of the memory blocks having the security functions of generating a predetermined security code, the memory unit further including a memory block selection element for rendering at least one of the plurality of memory blocks having the security functions accessible by pseudo access in accordance with an upper address signal in the address signal.

According to still another aspect of the present invention, there is provided a semiconductor memory unit further comprising pseudo access inhibition element for counting the number of times of pseudo accessing and for inhibiting pseudo access after counting a predetermined number of times.

According to the present invention, the security code generated by the security code generation section is designated at the time of manufacture of the semiconductor memory unit by a customer who uses the memory unit, and the manufacturer manufactures the security code generation section so that the designated code is generated. On the other hand, the terminal, with which use of this semiconductor memory unit is permitted, is designed to first perform a pseudo access operation for sending the same code as the predetermined code generated from the security code generation section to the address bus of the semiconductor memory unit in accordance with, for example, a program or the like whenever the semiconductor memory unit is connected to the terminal. The user of this semiconductor memory unit may operate keys of the terminal to manually start this pseudo access. When the semiconductor memory unit is connected to the terminal and supplied with electric power, the control bus is connected to the collation element by the control bus changeover element. In this state, read/write access to the memory is impossible. Then, the security code from the security code generation element and the address signal for pseudo access from the terminal are collated with each other by the collation element. If the security code and the address signal coincide with each other, the control bus changeover element connects the control bus to the memory element.

The semiconductor memory unit provided in the second aspect of the invention is provided with a plurality of memory blocks having security functions and each having the construction of the first semiconductor memory unit, and these memory blocks are connected in parallel with each other. For example, each of these memory blocks is used for a different application. The security code generation element of the memory blocks having the security functions respectively generate predetermined security codes, and independent security functions are thereby provided for the respective memory blocks. The memory block selection element renders at least one of the plurality of memory blocks having the security functions accessible by pseudo access in accordance with an upper address signal on the address bus, In the semiconductor memory unit provided in the third aspect of time of the invention, the number of pseudo accessing is counted by the pseudo access inhibition element to inhibit pseudo access after a predetermined number of times is thereby counted, thereby making security code deciphering difficult.

BRIEF DESCRIPTION THE DRAWINGS

FIG. 1 a block diagram of the basic internal construction of a semiconductor memory unit in accordance with a first embodiment of the present invention;

DESCRIPTION OF THE PREFERRED EMBODIMENTS

Figure 1:
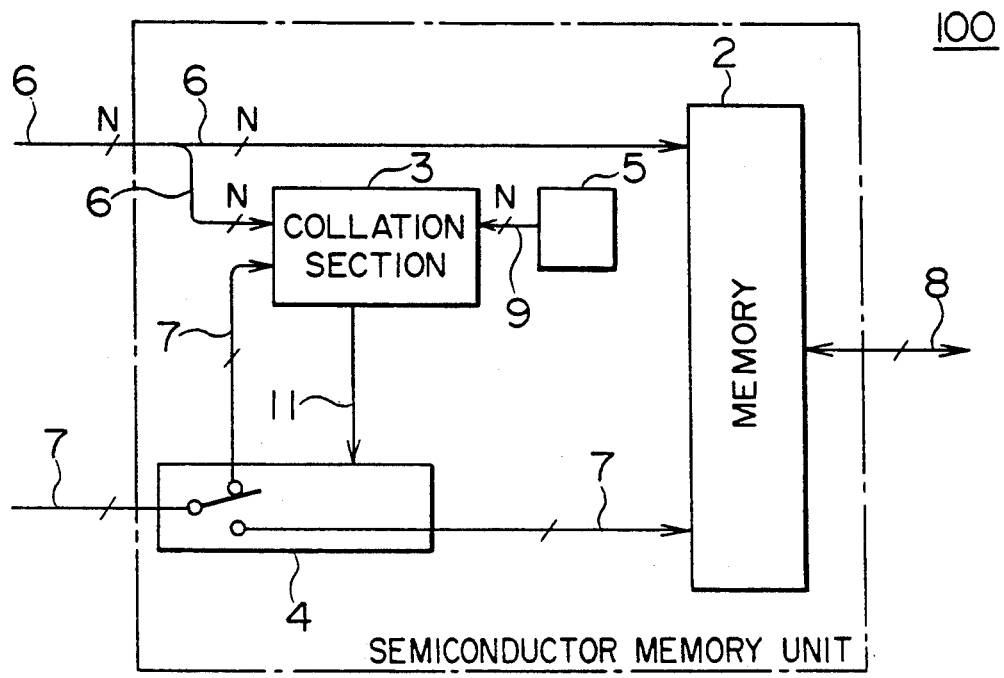
Figure 2:
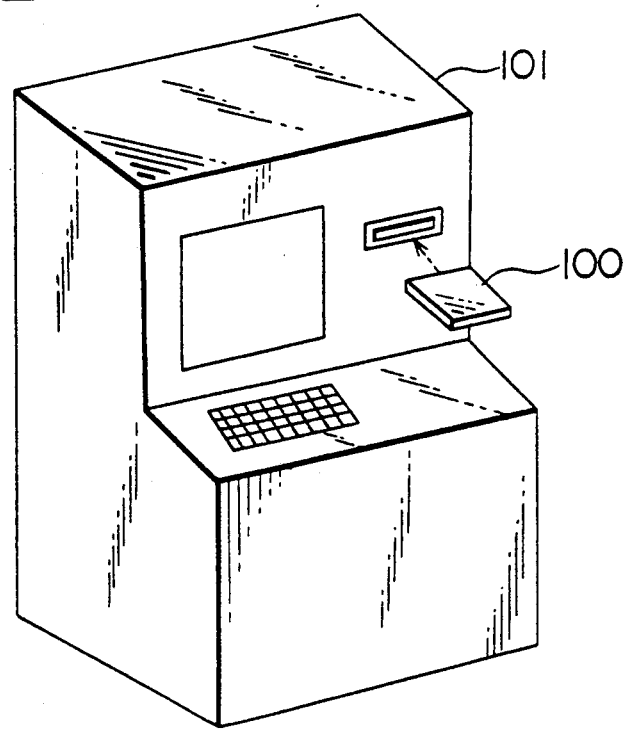
FIG. 2 is a perspective view of an example of the relationship between the semiconductor memory unit of the present invention and a terminal.
Figure 7:
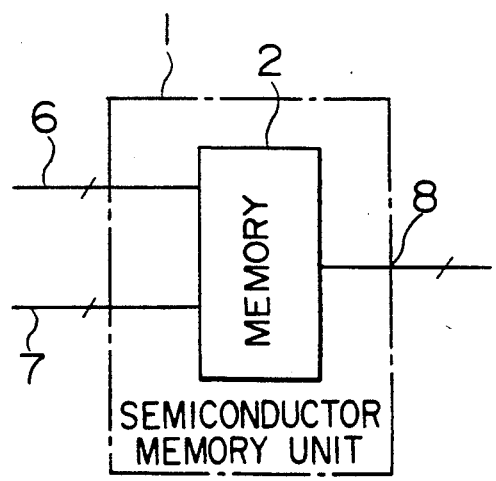
FIG. 7 is a schematic block diagram of a conventional semiconductor memory unit.

Embodiments of the present invention will be described below with reference to the accompanying drawings. FIG. 2 is a perspective view of an example of the relationship between a semiconductor memory unit 100 of the present invention and a terminal 101. In FIG. 2, the semiconductor memory unit 100 is shown as a memory card. When this memory unit is inserted into the terminal 101, which is an information processing apparatus, it is electrically connected to the terminal 101 to be used as a memory unit. FIG. 1 is a block diagram of the basic internal construction of the semiconductor memory unit in accordance with the present invention, in which components indicated by the same reference characters as the conventional memory card shown in FIG. 7 have the same or corresponding functions.

The memory unit of the present invention is further provided with a collation section 3, demultiplexer 4 and a security code generation section 5. Address bus 6 is connected to the memory 2 and to the collation section 3. The security code generation section 5 generates an N-bit security code which is previously designated at the time of manufacture of the semiconductor memory unit 100 by a customer who uses the memory unit. The manufacturer manufactures the security code generation section 5 so that the designated code is generated.

On the other hand, the terminal 101 shown in FIG. 2, with which use of the semiconductor memory unit 100 is permitted, is designed to first perform a pseudo access operation for sending a predetermined code to the address bus 6 of the semiconductor memory unit 100 in accordance with a program or the like whenever the semiconductor memory unit 100 is connected to the terminal 101. This code is the same as the security code generated by the security code generation section 5 of the semiconductor memory unit 100. The arrangement may be such that keys of the terminal 100 are operated by the user to manually start this pseudo access.

Referring back to FIG. 1, in the collation section 3, the address signal on the address bus 6 and the security code on a security code bus 9 are collated. If the address signal and the security code coincide with each other, a changeover signal 11 is latched at a high level H and is output. If they do not coincide with each other, the changeover signal is maintained at a low level L. The one-input two-output demultiplexer 4 constitutes a control bus changeover means for changeover connection of the control bus 7. When the changeover signal 11 is set to level H, the demultiplexer 4 changes the connection to of the bus 7 the memory 2. If the result of collation is non-coincidence and when the changeover signal 11 is at level L, the demultiplexer 4 maintains the state in which the control bus 7 is connected to the collation section 3. The demultiplexer 4 constituting the control bus changeover means may be replaced with a semiconductor switch.

Figure 3:
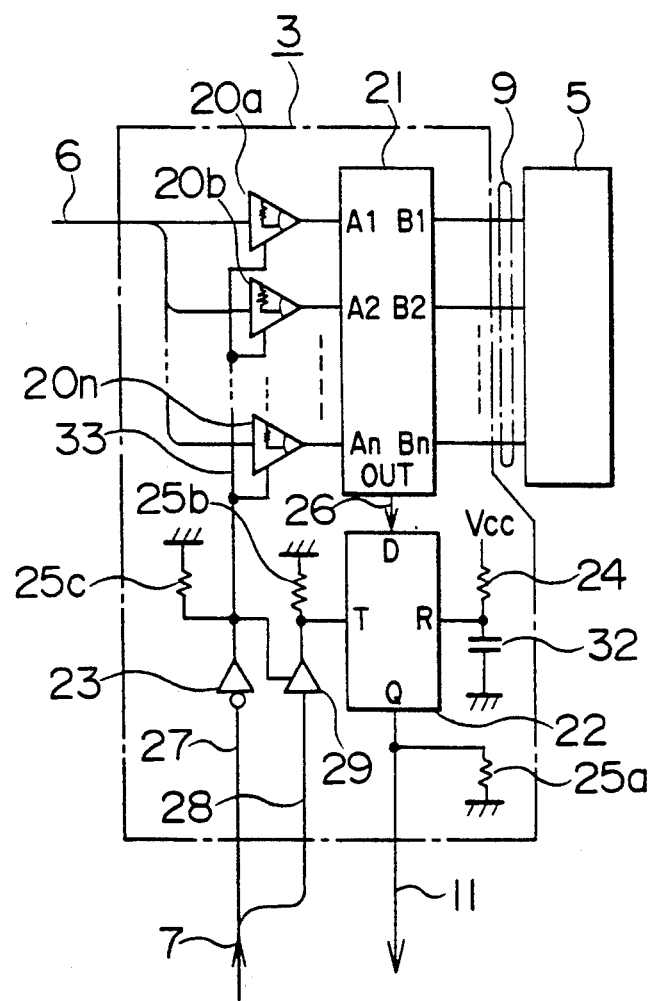
FIG. 3 is a circuit diagram of an example of the internal construction of a collation section of shown in FIG. 1.

FIG. 3 shows an example of the circuit construction of the collation section 3 in a case where the memory 2 is constituted of a MASKROM. In this case, control bus 7 signals are a chip enable signal 27 and an output enable signal 28. A comparator 21 compares and collates the security code on the security code bus 9 and the address signal on the address bus 6, and outputs a coincidence signal 26 at level H if the security code and the address signal coincide with each other, or at level L if they do not coincide with each other. A D type flip flop 22 latches the coincidence signal 26 with the output enable signal 28 used as a trigger signal.

Three-state-non-inverters 20a to 20n and 29 are controlled with the chip enable signal 27 and the output enable signal 28, respectively. Specifically, the three-state-non-inverters 20a to 20n incorporate pull-up resistors connected on the output side. The D type flip flop 22 latches a signal input to an input terminal D at a falling edge of a signal to a trigger terminal T. That is, the coincidence signal 26 is output while being latched by a falling edge of the output enable signal 28.

Figure 4:
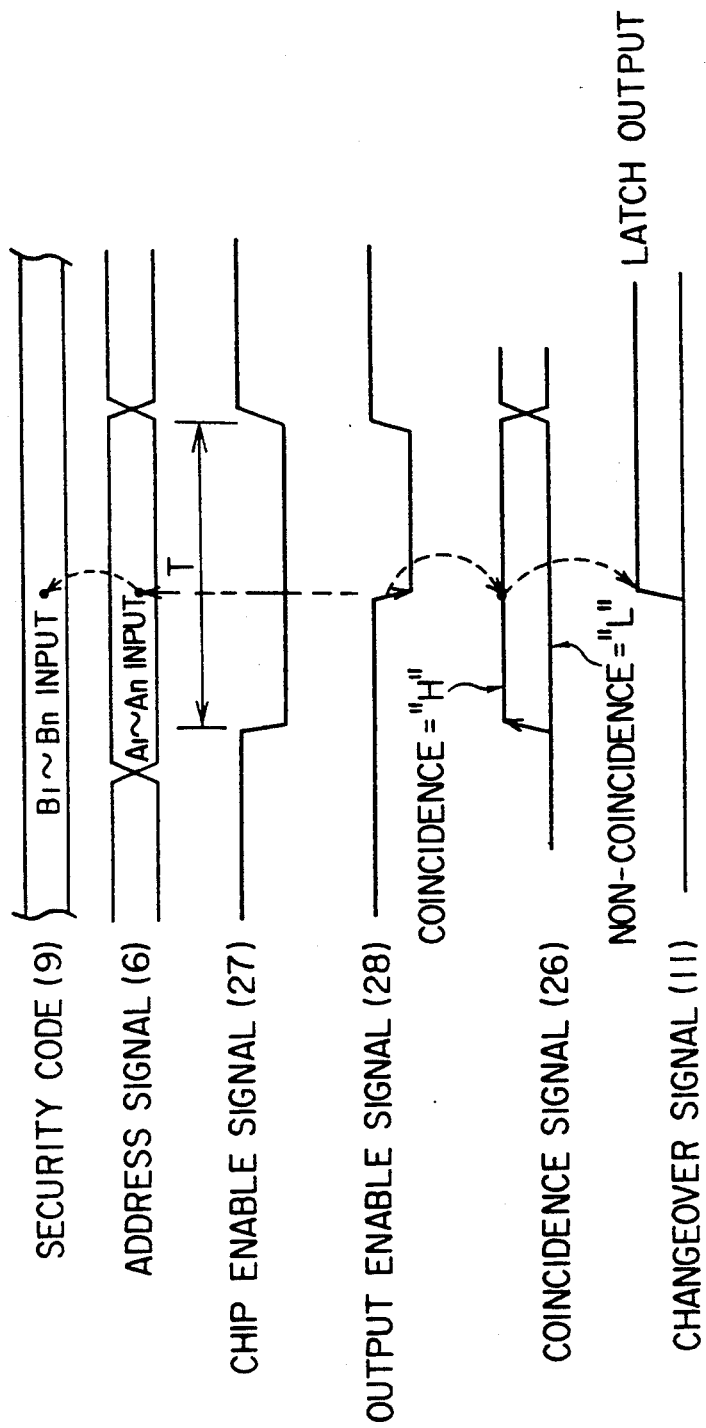
FIG. 4 is a timing chart of signals of the circuit shown in FIG. 3 during collation.

Pull-down resistors 25a to 25c function to set signal lines connected to them to level L when these lines are floating. A resetting resistor 24 and a resetting capacitor 32 are connected to a reset terminal R of the D type flip flop 22. When power is applied, an output terminal Q is reset to level L. Each of the three-state-non-inverters 20a to 20n is pulled up in it on the output side so that the output has level H, when a gate signal 33 is at level L. FIG. 4 shows a timing chart of the signals shown in FIG. 3.

The operation of this embodiment will now be described below. When the semiconductor memory unit 100 is connected to the terminal 101 and when electric power is supplied, changeover signal 11 is at level L, the semiconductor memory unit is in a pseudo access mode, and the demultiplexer 4 connects the control bus 7 to the collation section 3, as shown in FIG. 1. In this state, it is not possible for the terminal 101 to access the memory 2.

To enable access to the memory 2, it is necessary for the terminal 101 to perform a pseudo access operation, sending to the address bus 6 the address signal that is the same as the security code generated from the security code generation section 5. Therefore, as described above, a pseudo access operation for sending the same code as the predetermined security code from the terminal 101 to the address bus 6 is necessarily performed first automatically or manually after the semiconductor memory unit 100 has been connected.

The collation operation will be described below with reference to FIGS. 3 and 4. The security code generated by the security generation section 5 and the code sent from the terminal 101 to the address bus 6 are collated by the comparator 21 in the collation section 3. If these two codes coincide with each other, coincidence signal 26 at level H is output, placing the semi-conductor memory unit 100 into a normal access mode, or, if they do not coincide with each other, coincidence signal 26 at level L is output. The security code from the security code generation section 5 is constantly supplied to input terminals $B_1$ to $B_n$ of the comparator 21. On the other hand, when the chip enable signal 27 is at level L, the gate signal 33 is at level H, so that the three-state non-inverters 20a to 20n are in the enable state and the address signal 6 is supplied to input terminals $A_1$ to $A_n$ of the comparator 21. At a suitable time within the period of time T shown in FIG. 4 when the chip enable signal 27 is at level L (at the beginning of the period T in this embodiment), the comparator 21 compares and collates the parallel signals supplied to the input terminals $A_1$ to $A_n$ and the parallel signals supplied to the input terminals $B_1$ to $B_n$, and outputs the above-mentioned coincidence signal 26 indicating coincidence or non-coincidence therebetween.

Next, since the gate signal 33 to the three-state non-inverter 29 is at level H and since this inverter is in the enable state, the output enable signal 28 is supplied to the trigger input terminal T of the D type flip flop 22, and coincidence signal 26 is latched at the falling edge of the trigger signal and is output as changeover signal 11. If it is determined by the comparator 21 that address signal 26 and security code 9 do not coincide with each other, coincidence signal 26 is at level L and changeover signal 11 at level L is therefore latched and output. In this state, the terminal 101 cannot access the memory 2. However, if the address signal which is the same as the security code is sent to the address bus 6 by pseudo access from the terminal 101, coincidence signal 26 at level H is output by the operation of the comparator 21, and changeover signal 11 at level H is also output by being latched at the falling edge of output enable signal 28. When changeover signal 11 is set to level H, the demultiplexer 4 connects the control bus 7 to the memory 2. Thereafter, the memory 2 can be accessed from the terminal 101.

On the other hand, the collation section 3 is disconnected from the control bus 7, and the three-state non-inverters 20a to 20a and 29 are set in the disable state. The three-state-non-inverters 20a to 20n incorporate pull-up resistors and have outputs at level H in the disable state, as described above. In this case, signals at level H are output to all the input terminals $A_1$ to $A_n$ of the comparator 21. Use Of a security code in which all bits are set as level H should therefore be avoided. Also, a security code in which all bits are set as level L should be avoided because it is easy to decipher. Accordingly, the security of codes can be selected from $(2^N-2)$ codes, if the address signal 6 is composed of N bits. The security code generation section 5 may be, for example, of a type such that each line is connected to the power supply or ground. It is very difficult for a third person to access the memory 2 since it is not possible for the third person to know the security code.

Figure 5:
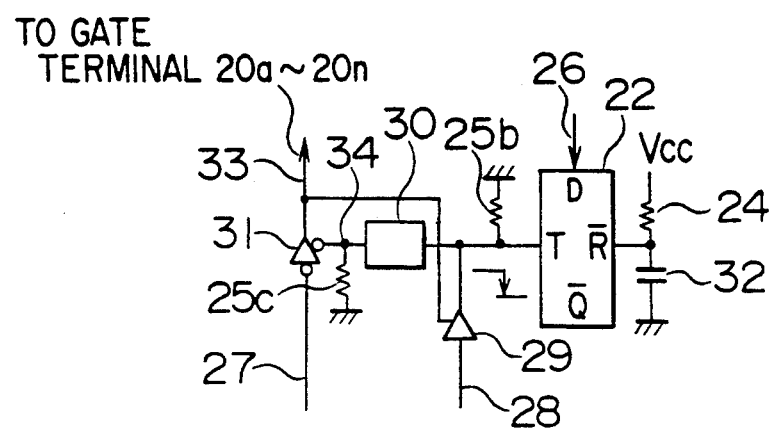
FIG. 5 is a circuit diagram of a portion of the collation section in accordance with a second embodiment of the present invention.

To decipher the security code, a third person may try pseudo access some times from the terminal 101 by changing the address signal. FIG. 5 shows the second embodiment of the present invention having a pseudo access inhibition means for preventing such deciphering. FIG. 5 shows a circuit which generally relates to the trigger terminal T input side of the D type flip flop 22 of the collation section 3 shown in FIG. 3.

In this circuit, the inverter 23 shown in FIG. 3 is replaced with a three-state buffer 31, and an N count circuit 30 is provided. The N count each circuit 30 counts falling of a signal output from the three-state-non-inverter 29. When the number of times counted exceeds a predetermined number, e.g., N, the count circuit 30 latches a signal at level H and outputs this signal to a control terminal of the three-state buffer 31 to set the same in the disable state, whereby collation operation, i.e., pseudo access is thereafter inhibited, so that code deciphering is more difficult. The N counter circuit 30 may be an N counter formed by connecting a plurality of flip flop in series, a counter memory or the like, and details of it will not be described in this specification.

If the counter circuit 30 is a nonvolatile device, the counter circuit 30 always outputs a signal at level H each time power is supplied, so that there is no means for access to the memory 2 and the semiconductor memory unit 100 cannot be used as a memory.

Figure 6:
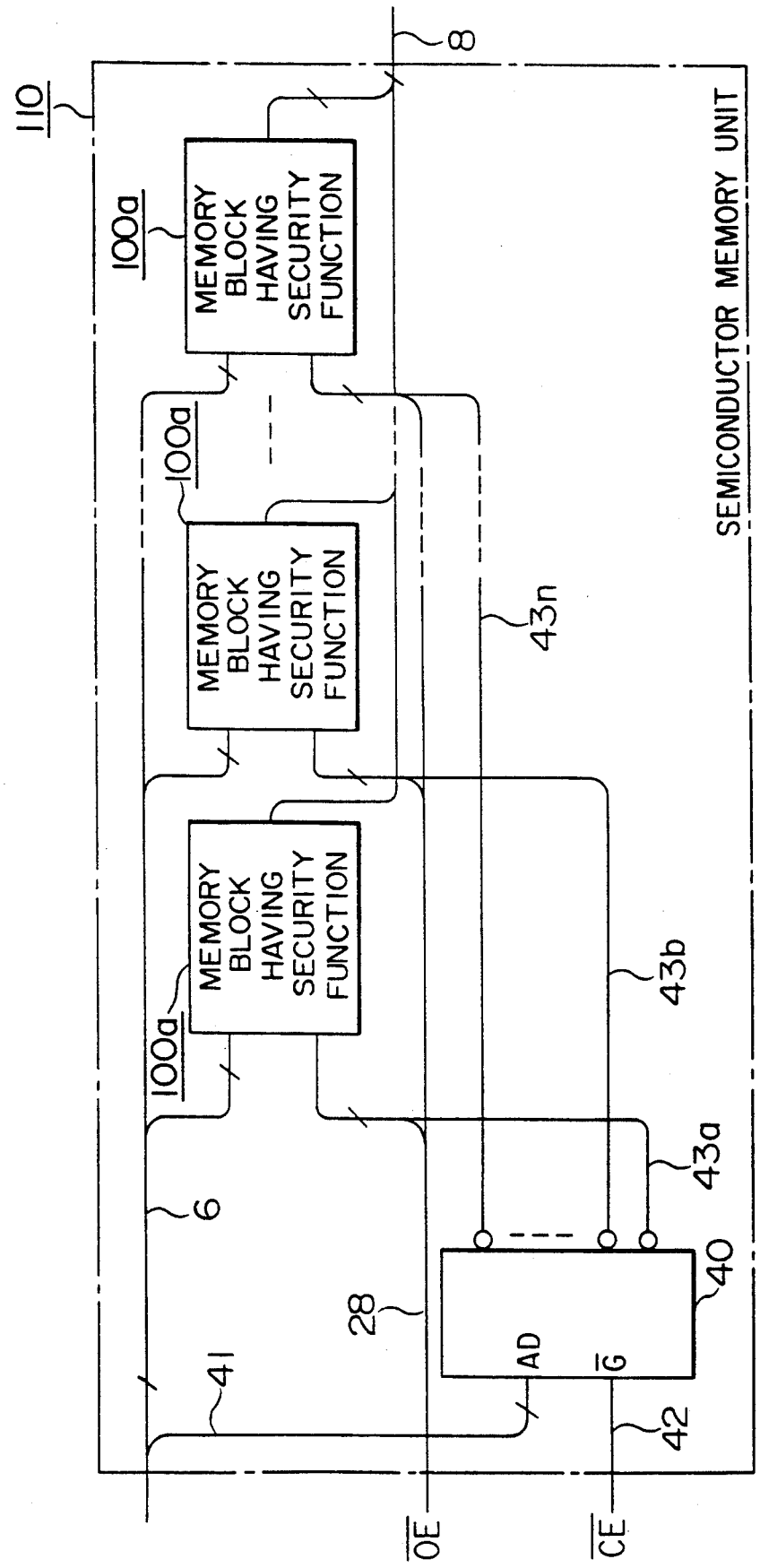
FIG. 6 is a block diagram of the basic internal construction of a semiconductor memory unit in accordance with a third of the present invention.

FIG. 6 shows the third embodiment of the present invention. A semiconductor memory unit 110 in accordance with this embodiment has a parallel arrangement of a plurality of memory blocks 100a each having the construction shown in FIG. 3 and having a security function. A line for supplying a card enable signal 42 ($\overline{CE}$) to the semiconductor memory unit 110 is connected to an address decoder 40. The address decoder 40 selectively applies the card enable signal 42 as chip enable signals 43a to 43n to predetermined ones of the plurality of memory blocks 100a in accordance with an upper address signal 41, thereby enabling read/write access to the memories of the predetermined memory blocks according to the results of the above-described pseudo access and collation.

The security codes for the memory blocks 100a may be the same, or different security codes may be provided for them. If a common security code is used, an integrated security function becomes effective. If different security codes are set, security functions become effective independently of each other with respect to the blocks.

For example, in a case where the semiconductor memory unit 110 is used for a plurality of applications, security codes may be used which differ from each other with respect to the memory blocks respectively used in the applications, whereby independent security functions become effective for the respective applications. The memory 2 (FIG. 1) in each memory block 100a is not limited to one kind; a plurality of kinds of memories, such as MASKROMs, SRAMs, OTPROMs, EPROMs, E$^2$PROMs, flash E$^2$PROMs and the like, may be used together. In the other embodiments, as well, the kind of memory 2 is not limited to that mentioned above. Each memory block 100a having a security function may be provided with the pseudo address inhibition means shown in FIG. 5. The standardization of memory cards is presently being carried forward. With the spread of many interchangeable mediums, needs for protection of valuable information and data will arise. The present invention invention has been made from this viewpoint, and makes it possible to produce a portable memory having a single yet very effective security protection function.

As described above, in the semiconductor memory unit in accordance with the present invention, a security code generated by the security code generation means is compared and collated with an address signal sent from a terminal to the address bus by the collation means, and the control bus is connected to the memory means to enable access to the memory means, only when the security code and the address signal coincide with each other. In this process, when the semiconductor memory unit is connected to the terminal and is supplied with electric power, a pseudo access operation for sending the same code as the predetermined security code to the address bus of the semiconductor memory unit is first performed. To perform this operation, a program for effecting pseudo access is previously set in the terminal with which use of the semiconductor memory unit is permitted, or the user operates keys of the terminal.

In this system, therefore, persons other than those permitted to use the semiconductor memory unit cannot access the memory means of the semiconductor memory unit, or the memory means cannot be accessed from terminals other than those of which use with the semiconductor memory unit is permitted. It is thereby possible to provide a memory unit preventing valuable data from being forged, altered or copied without permission and thus having a very high security protection effect. In addition, the memory unit of the present invention is suitable for wide use and is operable with the interface circuits of terminals presently used, because the same access means and control signals as those of conventional memory units are also adopted.

In accordance with the second embodiment of the present invention, an access inhibition means is provided which counts the number of times of pseudo accessing and which inhibits accessing after a predetermined number of times is thereby counted, thereby making security code deciphering more difficult.

In accordance with the third embodiment of the present invention, a plurality of memory blocks each having the construction of the first embodiment and having the security function are connected in parallel with each other to form a semiconductor memory unit, and each memory block having the security function can be selectively accessed in accordance with an address signal. In this case, if different security codes are respectively set for the memory blocks, independent security functions can be obtained for the respective memory blocks. Therefore, if one semiconductor memory unit is used for a plurality of applications, independent security functions can be obtained with for the respective applications.

What is claimed is:

1. A semiconductor memory block connectable to an information processing apparatus, said semiconductor memory block comprising:
   memory means for storing information;
   access means including an address bus, a control bus, and a data bus for accessing said memory means;
   security code generation means for generating a predetermined security code;
   collation means for comparing the predetermined security code generated by said security code generation means with an address signal on the address bus supplied by said information processing apparatus and generating an output signal when the security code coincides with the address signal; and
   control bus changeover means for placing said semiconductor memory block in a pseudo access mode by connecting the control bus to said collation means, thereby preventing the information processing apparatus from accessing said memory means whenever said semiconductor memory block is connected to the information processing apparatus and thereafter supplied with electrical power, and for placing the semiconductor memory block in a normal access mode by connecting said control bus to said memory means, thereby giving the information processing apparatus repeated access to said memory means without operation of said collation means whenever said collation means generates an output signal indicating that the predetermined security code coincides with the address signal supplied by the information processing apparatus and said semiconductor memory block is in the pseudo access mode.

2. The semiconductor memory block of claim 1 comprising pseudo access mode inhibition means for counting a number of times that the information processing apparatus accesses said semiconductor memory block while said semiconductor memory block is in the pseudo access mode and for inhibiting access by the information processing apparatus to said semiconductor memory block after a predetermined number of times is counted.

3. The semiconductor memory block including a plurality of memory blocks according to claim 1 connected in parallel, said memory blocks having security functions which are effective independently wherein said security code generation means of each of said memory blocks respectively generates a different predetermined security code; and
   memory block selection means for making at least one of said plurality of memory blocks accessible in the pseudo access mode in accordance with an upper address signal on the address bus.

4. The semiconductor memory block according to claim 2 wherein said semiconductor memory block is a memory card.

5. The semiconductor memory block according to claim 2 wherein the pseudo access inhibition means is a non-volatile memory device.

6. The semiconductor memory block according to claim 3 wherein each of said memory blocks includes pseudo access inhibition means for counting a number of times that the information processing apparatus accesses said semiconductor memory block while said semiconductor memory block is in the pseudo access mode and for inhibiting access by the information processing apparatus to said semiconductor memory block after a predetermined number of times is counted.

7. The semiconductor memory block according to claim 6 wherein the pseudo access inhibition means is a non-volatile memory device.

8. The semiconductor memory unit according to claim 6 wherein said semiconductor memory unit is a memory card.

9. An information processing system comprising:
   at least one semiconductor memory unit including:

memory means for storing information, access means including an address bus, a control bus, and a data bus for accessing said memory means, security code generation means for generating a predetermined security code, collation means for comparing the predetermined security code generated by said security code generating means with an address signal on said address bus and generating an output signal when the security code coincides with the address signal, and control bus changeover means for placing said semiconductor memory unit in a pseudo access mode by connecting said control bus to said collation means and disconnecting said control bus from said memory means whenever said collation means generates the output indicating that the predetermined security code coincides with the address signal, thereby preventing the information processing apparatus from accessing said memory means and said semiconductor memory unit is in the pseudo access mode, and for placing said semiconductor memory unit in a normal access mode by connecting said control bus to said memory means to enable repeated access to said memory means without operation of said collation means; and at least one information processing apparatus for applying electrical power to said semiconductor memory unit, for performing automatic and manual initiation of the pseudo access mode, and for generating on the address bus said address signal coinciding with the predetermined security code.

10. The information processing system according to claim 9 including a pseudo access inhibition means for counting a number of times that the information processing apparatus accesses said semiconductor memory unit while said semiconductor memory unit is in the pseudo access mode and for inhibiting access by the information processing apparatus to said semiconductor memory unit after a predetermined number of times is counted.

11. The information processing system according to claim 10 wherein the pseudo access inhibition means is a non-volatile memory device.

* * * * *